United States Patent
Blondeau et al.

(10) Patent No.: US 7,333,400 B2
(45) Date of Patent: Feb. 19, 2008

(54) REGULATED LOW POWER CONTROL SYSTEM FOR ELECTROSTATIC ACTUATORS

(75) Inventors: Fabien Blondeau, Le Landeron (CH); Emmanuel Fleury, Moutier (CH); Pierre-André Meister, Bienne (CH); André Zanetta, Neuchâtel (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/562,520

(22) Filed: Nov. 22, 2006

(65) Prior Publication Data
US 2007/0122075 A1 May 31, 2007

(30) Foreign Application Priority Data
Nov. 30, 2005 (EP) .................. 05111536

(51) Int. Cl.
*G06F 1/04* (2006.01)
*G05B 23/02* (2006.01)
*G05B 19/10* (2006.01)
*H03M 1/82* (2006.01)

(52) U.S. Cl. .............. 368/157; 318/565; 318/566; 318/685; 341/151; 341/152

(58) Field of Classification Search ........... 368/10, 368/155–160; 318/560, 565, 566, 599, 685, 318/696; 341/144, 151, 149, 152; 361/152–156
See application file for complete search history.

(56) References Cited

U.S. PATENT DOCUMENTS

| | | | |
|---|---|---|---|
| 6,082,196 A * | 7/2000 | Nonoyama et al. ...... 73/514.18 | |
| 6,438,010 B1 | 8/2002 | Pease | |
| 6,674,383 B2 * | 1/2004 | Horsley et al. ............ 341/152 | |
| 6,750,589 B2 * | 6/2004 | Cabuz ....................... 310/309 | |
| 6,933,873 B1 | 8/2005 | Horsley et al. | |
| 7,161,518 B1 * | 1/2007 | Webb et al. ............... 341/152 | |
| 2001/0048784 A1 | 12/2001 | Behin et al. | |

FOREIGN PATENT DOCUMENTS

EP      0 865 151 A2      9/1998

OTHER PUBLICATIONS

European Search Report issued in corresponding application No. EP 05 11 1536 completed May 23, 2006.

* cited by examiner

*Primary Examiner*—Vit W Miska
(74) *Attorney, Agent, or Firm*—Griffin & Szipl, P.C.

(57) ABSTRACT

The invention concerns a control system for a servomechanism comprising a control member that can move between first and second positions defining a variable electric quantity respectively between a minimum quantity and a maximum quantity, characterized in that the control system further comprises low voltage powering means, voltage increase means connected to the terminals of the low voltage powering means and delivering a high voltage at output, means for measuring a value of the variable electric quantity, powered by the low voltage powering means when the high voltage is being generated, and means for regulating the voltage increase means arranged to increase the high voltage delivered for a variation in the measured electric quantity value lower than a variation threshold determined by the servomechanism, respectively to decrease the high voltage delivered for a variation in the measured electric quantity values higher than the determined variation threshold.

15 Claims, 1 Drawing Sheet

REGULATED LOW POWER CONTROL SYSTEM FOR ELECTROSTATIC ACTUATORS

This application claims priority from European Patent Application No. 05111536.8, filed Nov. 30, 2005, the entire disclosure of which is incorporated herein by reference.

FIELD OF THE INVENTION

The present invention generally concerns a regulated low power control system for electrostatic actuators, a servomechanism controlled by such a control system and a portable electronic apparatus incorporating such a servomechanism.

An "actuator" means a power member, such as for example a servomotor, stepping motor, couple motor, electromagnet, or any other device actuating a member in a servomechanism. A "servomechanism" means a closed loop control system comprising one or several members with a mechanical function. The member with a mechanical function is generally an actuator.

BACKGROUND OF THE INVENTION

In the prior art, control systems for a servomechanism based on the use of a control member that can move between first and second positions defining a variable electric quantity, are known. One example of such a mobile control member is a comb drive.

Comb drives, which are used in micro-electromechanical MEMS systems, require relatively high operating voltages (40-600V) to obtain interesting forces. Currently available electronic circuits can control these comb drives without any particular operating problem. The problem lies in optimising the power consumption of the system. The main problems are as follows:
- maintaining electronic systems powered at high voltages (40-600V) generates consequential leakage currents and/or particular implementations for limiting such leakage currents;
- since current comb drive capacitances are of the order of several pF to several tens of pF, the stray capacitances powered by these high voltages participate significantly to the system losses;
- the electrostatic force of the comb drives is a function of the square of the voltage applied between the electrodes; the system has to guarantee sufficient voltage to ensure movement within a defined time period but a higher voltage eventually results in loss (excessive acceleration of the system followed by absorption when the stop is reached).

SUMMARY OF THE INVENTION

It is one of the main objects of the present invention to overcome the aforementioned drawbacks by optimising the power consumption of the system, and in order to do so it is important to apply the right voltage and/or the right duration to control the mobile drive member.

Thus, according to one embodiment, the present invention concerns a control system for a servomechanism comprising a control member that is mobile between first and second positions defining a variable electric quantity respectively between a minimum quantity and a maximum quantity, characterized in that the control system further comprises low voltage powering means, means for increasing the voltage connected to the terminals of the low voltage powering means and delivering a high voltage at output, means for measuring a value of the variable electric quantity, powered by the low voltage powering means when the high voltage is generated, and means for regulating the voltage increase means arranged for increasing the high voltage delivered for a variation in the measured electric quantity values lower than a variation threshold determined by the servomechanism, and respectively decreasing the high voltage delivered for a variation in the measured electric quantity values higher than the determined variation threshold.

Advantageous embodiments of the control system form the subject of the dependent claims.

According to another aspect, the invention also concerns a servomechanism comprising a control system according to the invention, and characterized in that the servomechanism is selected from among the following elements: servomotor, stepping motor, couple motor, electromagnet, mobile hands on a dial, optical displays.

Advantageously, the servomechanism is an electrostatic motor formed by micro-electro-mechanical technology (MEMS).

According to another aspect, the invention also concerns a portable electronic apparatus, in particular a wristwatch comprising a servomechanism according to the invention.

BRIEF DESCRIPTION OF THE DRAWINGS

Other features and advantages of the present invention will appear more clearly upon reading the following detailed description given solely by way of non limiting example and illustrated by the annexed drawings in which.

DETAILED DESCRIPTION OF THE INVENTION

Figure 1:
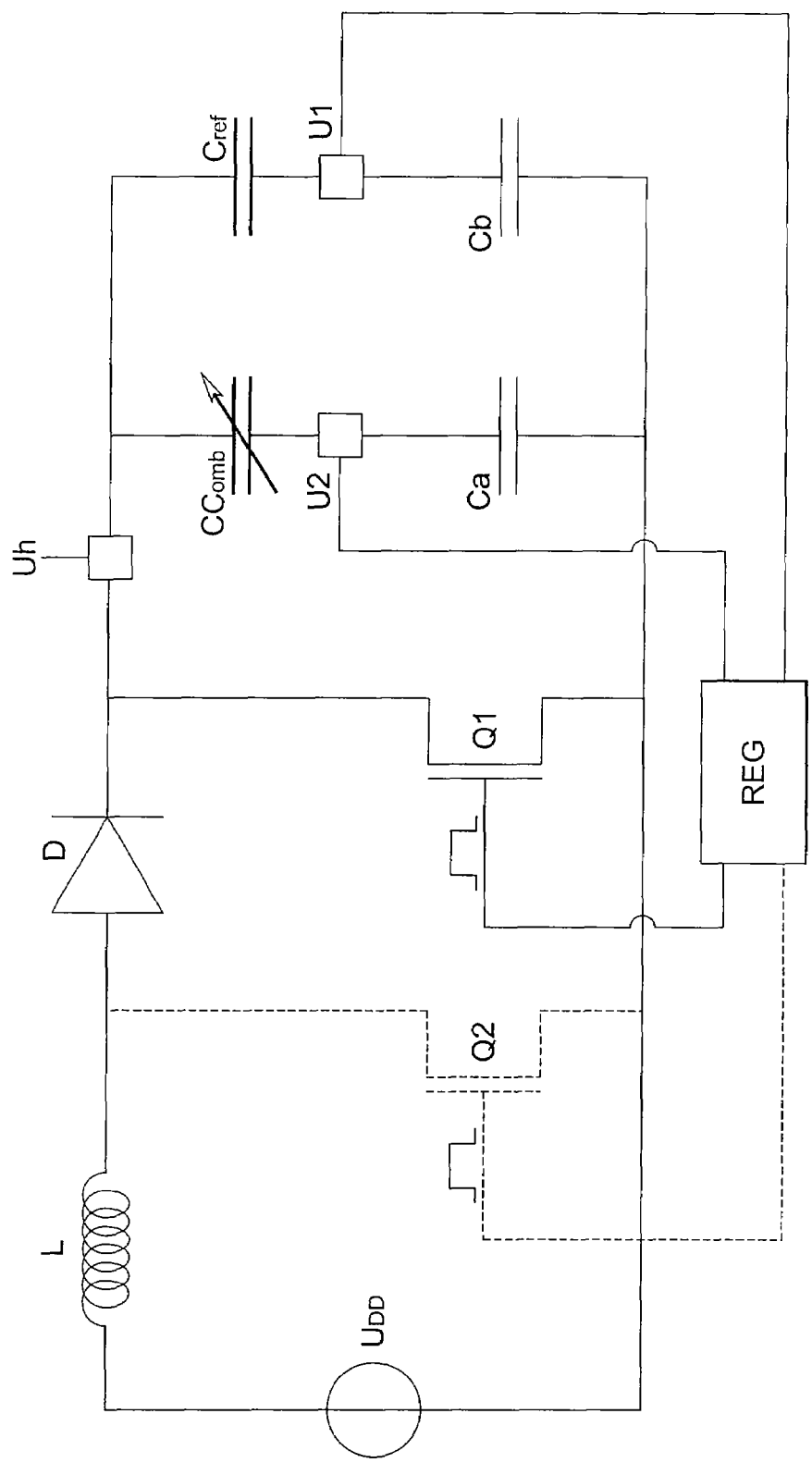
FIG. 1 is a diagram of the control system according to two embodiments of the invention.

According to a first embodiment of the invention shown in FIG. 1, in which the elements in dotted lines should not be considered, the control system for a servomechanism comprising a control member (not shown) mobile between first and second positions defining a variable electric quantity Ccomb respectively between a minimum quantity Ccomb_min and a maximum quantity Ccom_max. In the example shown, the variable electric quantity is a variable capacitance advantageously obtained by the use of a mobile control member such as an electrostatic actuator, for example a comb drive. The control system further comprises low voltage powering means $U_{DD}$, for example lower than or equal to 5V, voltage increase means connected to the terminals of the low voltage powering means and delivering a high voltage Uh at output, for example of the order of 100V, and more generally comprised between 40 and 600V.

According to the first embodiment shown in FIG. 1, the increase means comprise an inductance L in series with uncoupling means D and switching means Q1 having one control terminal and two current terminals, the inductance being connected at output to low voltage powering means $U_{DD}$ and the uncoupling means D whose output is connected to a current terminal of switching means Q1, the other current terminal of switching means Q1 being connected to a reference potential, for example the earth of the control system, the control terminal of the switching means being connected to the output of regulating means REG.

It will of course be understood that the voltage increase means of the first embodiment according to the invention are given by way of advantageous variant, but that other more conventional voltage increase circuits could be provided instead.

The control system further comprises means for measuring a value of the variable electric quantity, powered by the low voltage powering means when said high voltage is generated. According to a preferred variant, these measuring means comprise a first branch connected in parallel to switching means Q1 and comprising in series a first capacitance Cref and a second capacitance Cb of an order of magnitude greater than that of the first capacitance Cref, and a second branch connected between variable capacitance Ccom and the reference potential and comprising a third capacitance Ca of an order of magnitude greater than that of variable capacitance Ccomb. The variable capacitance Ccomb is defined by the position of the mobile control member and connected between the output of the voltage increase means and the measuring means. By way of example, the following capacitance values could be chosen: Ccomb of the order of 10 pF, Ca of the order of 2 nF, Cb of the order of 100 pF and Cref of the order of 0.5 pF.

The system further comprises means REG for regulating the voltage increase means arranged for increasing the high voltage delivered for a variation in the measured values of electric quantity Ccomb less than a variation threshold determined by the servomechanism, and respectively decreasing the high voltage delivered for a variation in the measured electric quantity values higher than the determined variation threshold. The regulating means REG are arranged for providing a pulse of longer length than the preceding pulse across the control terminal of switching means Q1 to increase the high voltage and to provide a pulse of shorter length than the preceding pulse across the control terminal of the first switching means Q1 to decrease said high voltage.

According to a second embodiment of the invention comprising all the elements of the first embodiment presented hereinbefore, to which those elements shown in dotted lines in FIG. 1 have to be also considered. The difference between the two embodiments from the structural point of view thus essentially lies in the voltage increase means which further comprise, according to this second embodiment, second switching means Q2 connected between the output of inductance L and the reference potential.

Again according to this second embodiment, the regulating means REG are arranged to provide a pulse of longer duration than the preceding one across the control terminal of the second switching means Q2 to increase the high voltage and to provide a pulse of shorter length than the preceding one across the control terminal of the second switching means Q2 to decrease said high voltage. Regulating means REG are further arranged to supply a pulse across the control terminal of the first switching means Q1 to decrease high voltage Uh.

Reference will now be made again to FIG. 1 in order to understand how the two embodiments of the invention presented hereinbefore operate. As was mentioned in the introduction to the description, the main objects of the invention are to maintain the high voltage only when the latter is required to limit leakage currents, to minimise the components in the high voltage in order to limit stray capacitances in the high voltage and to adapt the activation voltage as a function of the of the directly measured system needs.

One possible voltage increase circuit is based on the transfer of energy from one inductance used as "high voltage" source. This circuit has the advantage of being able to define the energy to be transferred, thus indirectly the supply voltage, by adapting the duration during which the transistor Q1, according to the first embodiment, or Q2 according to the second embodiment, is conductive.

According to the first embodiment, transistor Q1 is made conductive to short-circuit inductance L, which when transistor Q1 is again non-conductive, enables the voltage delivered by voltage source UDD to be increased, by discharging the coil L in the capacitance network, the diode D uncoupling the system into two and thus preventing the energy transmitted to the capacitance network from returning into the coil. This first embodiment has the advantage of having fewer stray capacitances than may be the case with a two transistor solution according to the second embodiment.

According to the second embodiment, first of all transistor Q2 is made conductive to short-circuit inductance L, which, when transistor Q2 is made conductive again enables the voltage Uh to be increased by discharging coil L in the capacitance network. Then, after actuating the comb drive, transistor Q1 is made conductive to decrease voltage Uh.

One feature of this circuit is that voltage Uh is not controlled without a regulating loop. Thus, a regulating loop REG is provided, using capacitance network Ca, Cb, Cref to execute feedback control depending upon the variations in the value of the comb drive member capacitance Ccombs. The capacitance of this comb drive member varies between Com_min and Com_max as a function of the position of the mobile comb.

In order to execute this feedback function, a measurement system (Ca, Cb and Cref) is directly powered during the high voltage application in order to optimise control. The object is evidently to maximise the energy transferred into Ccom and thus to have a sufficiently small voltage U2(t), but still allowing simple electronic processing, i.e. with a voltage U2(t) preferably of the order of 0.1-0.5V. By way of example, the "high voltage" Uh can be defined at 100V and Ccomb at 10 pF.

As capacitances Ca and Cref are fixed in the branch that contains them, voltage U1(t) is a reduced image of voltage Uh:

$$U1(t) = \frac{C_{ref}}{C_b + C_{ref}} Uh(t) \rightarrow Uh(t) \qquad [E1]$$
$$= \frac{C_b + C_{ref}}{C_{ref}} U1(t)$$

As Ca is known and fixed, voltage U2(t) represents the load injected into the other branch containing capacitances Ccom and Ca:

$$U2(t) = \frac{1}{Ca} \int i_1(t) \cdot dt \qquad [E2]$$
$$= \frac{1}{Ca} Q_1(t) \rightarrow Q_1(t)$$
$$= Ca \cdot U2(t)$$

The values of Ca and Cb are defined (see the explanation below) to obtain voltages U1(t) and U2(t) of the order of 50 to 500 times less than UH(t), thus negligible in the $1^{st}$ approximation in relation to Uh(t). The voltage at the terminals of Ccom can be approximated to Uh(t), the value Ccom can be deduced therefrom:

$$C_{com}(t) \cong \frac{Q_1(t)}{Uh(t)} \quad [E3]$$

$$= \frac{C_a \cdot U2(t)}{Uh(t)}$$

$$= C_a \frac{C_{ref}}{C_b + C_{ref}} \frac{U2(t)}{U1(t)}$$

The equation [E3] shows that Ccom(t) can be measured at any time without having to know voltage Uh(t), which may, in accordance with this principle, have any value, varying over time, reasonably, without disturbing the indirectly measured value of Ccom(t).

Knowing the value of the comb drive capacitance over time enables the position of the latter to be deduced, which allows regulation in accordance with the system needs. In the case of a low power system, the two main objects of regulation are confirmation of the complete movement, which is deduced from the capacitance variation and minimisation of energy consumption while optimising voltage Uh, namely the transferred energy.

The variation in capacitance Ccom allows variation in movement to be directly deduced, thus the speed of movement of the comb drive. The mechanical energy supplied via Uh(t) can then be broken down into two parts. First, the energy to overcome friction, useful forces/couple and any forces from the necessary system springs, and secondly, the energy for accelerating the system (inertia, kinetic energy).

The "force" accelerating the system is the difference between the force provided by the comb drive subtracted from the useful forces, friction and the spring. This force must be sufficient to allow movement in the desired time but must be kept as low as possible in order to optimise consumption. The available time is defined by the application and can varying depending upon which mode the system is in.

In a horological application, for example a wristwatch comprising a stepping motor, it may be different during normal working or when the time is being set. If the time used for the movement is declared to be too long, the next step will be executed with more energy (longer control pulse from the transistor) and conversely if the time used for the movement is declared to be too short, the next step will be executed with less energy. If the step is declared not to have been made, it is executed again with a lot more energy in order to guarantee the step and the length of the pulse will be extended for the next step.

As the forces can vary significantly depending upon the system environment (load, friction), adapting the voltage considerably reduces power consumption compared to a system systematically providing the same voltage guaranteeing the step in all conditions.

A calibrating mode can easily be implemented with this principle in order to determine the maximum capacitance if the latter or the regulation system can drift over time. A quantity of energy sufficient to guarantee the complete movement has simply to be transferred and the different values extracted therefrom. Although this is not "economical" from the energy point of view, since this only has to be carried out sporadically (for example once in 1000 times), the impact on power consumption remains very modest.

According to the second embodiment using the two transistors Q1 and Q2, it is possible to transfer an additional quantity of energy by activating transistor Q2, by means of a pulse, if the confirmation of the complete movement is not obtained. This principle allows the energy transfer and system reset phases to be managed independently. According to the first embodiment using only transistor Q1, these phases are dependent and complementary. However, it will be noted that the use of two transistors increases stray capacitances.

It should be noted that the additional measurement capacitances are not significantly detrimental to the transfer of energy to the comb drive.

The electric energy in the comb drive capacitance is defined by the following equation:

$$W_{com} = \frac{1}{2} C_{com} \cdot U_{com}^2 \quad [E4]$$

Voltage U2(t) is defined by relation (a):

$$U2(t) = \frac{C_{com}(t)}{C_{com}(t) + C_a} Uh(t) \rightarrow \frac{U2(t)}{Uh(t)} \quad [E5]$$

$$= \frac{C_{com}(t)}{C_{com}(t) + C_a}$$

The capacitance Ca is defined by relation (b):

$$C_a = \frac{1 + \frac{U2}{Uh}}{\frac{U2}{Uh}} C_{com} \quad [E6]$$

$$= 201 \cdot C_{com}$$

$$\cong 2.01 \text{ nF}$$

The energy ratio in the two capacitances of the branch (Ccom, Ca) is:

$$\frac{W_{Ccom}}{W_{com} + W_{Ca}} = \frac{\frac{1}{2} C_{com} \left( Uh - \frac{C_{com}}{C_{com} + C_a} Uh \right)^2}{\frac{1}{2} C_{com} \left( Uh - \frac{C_{com}}{C_{com} + C_a} Uh \right)^2 + \frac{1}{2} C_a \left( \frac{C_{com}}{C_{com} + C_a} Uh \right)^2} \quad [E7]$$

$$\frac{W_{Ccom}}{W_{com} + W_{Ca}} = \frac{C_{com} \left( 1 - \frac{C_{com}}{C_{com} + C_a} \right)^2}{C_{com} \left( 1 - \frac{C_{com}}{C_{com} + C_a} \right)^2 + C_a \left( \frac{C_{com}}{C_{com} + C_a} \right)^2}$$

$$\cong 99.5\%$$

The approach is the same for the other branch, the minimum energy must be injected therein. By way of example, Cref can be defined at 0.5 pF and voltage U1 at 0.5V. By applying the same approach as [E5] and [E6] Cb=100.5 pF.

The equivalent capacitances for each branch are:

Equivalent capacitance Ccomb/Ca:

$$Ccom//Ca = \frac{C_{com} + C_a}{C_{com}C_a} \quad [E8]$$
$$= \frac{202}{201}C_{com}$$
$$\cong C_{com}$$

Equivalent capacitance Cref/Cb:

$$Cref//Cb = \frac{C_{ref} + C_b}{C_{ref}C_b} \quad [E9]$$
$$\cong C_{ref}$$

As the voltage across the two branches is identical (Uh), the energy ratio in the 2 branches is the capacitance ratio Ccom/(Ccom+Cref)=95%.

These energy calculations show that practically all of the energy is transferred into the comb drive (Ccomb). Moreover, the connection pads of the integrated circuits have a capacitance of the order of 3-5 pF, but in this proposition, these capacitances come in parallel to Ca and Cb which are much larger (2 nF/100 pF), therefore their impact is not detrimental despite capacitance values Ccomb and Cref of the order of picofarads or tens of picofarads. If the system is totally discharged (or discharged to a known value), it is reset at each step, which makes it insensitive to drifts generated by the various leakage currents.

This system also has the advantage of working with measurement voltages (U1, U2) and with "low voltage" (0-1.5, 3 or 5V) control voltages and can thus be integrated in a standard microelectronic process. The only semiconductor components exposed to the "high voltage" are the diode and the transistor(s) (Q1, Q2) to be mounted as required according to the configurations. These components exist on the market. For the sake of optimising power consumption, the transistors must have the lowest possible drain-bulk-source capacitances.

In the numerical application example, the Ccomb/Ca and Cref/Cb ratios are very small, which allows the equation [E3] to be simplified without any great errors:

$$C_{com}(t) \cong C_a \frac{C_{ref}}{C_b + C_{ref}} \frac{U2(t)}{U1(t)}$$
$$\cong \frac{C_a}{C_b} \cdot \frac{U2(t)}{U1(t)} \cdot C_{ref}$$

The regulating system using the 2 voltages U1(t) and U2(t) has to have a very high input impedance so as not to disturb the currents in the two branches. Such impedances are common in the field of microelectronics, particularly in certain operational amplifiers.

The invention described hereinbefore has numerous advantages. In particular, the measuring system allows the position and speed of movement of the comb drive to be known electrically, which means the movement has actually accured and energy consumption optimised as a function of the time available to execute the movement. This measurement can measure the impact of shocks on the position of the comb drive. The measuring system is independent of the supply voltage, which thus means that practically any "high voltage" generation system can be used. The measuring system only very modestly affects the energy transferred to the comb drive. Apart from generating the "high voltage", the control circuit operates at a low voltage enabling it to be integrated in a standard microelectronic process. The "high voltage" is actually only available during execution of the step, the rest of the time the system operates at a low voltage.

It should also be noted that the invention concerns more generally a servomechanism comprising a control system according to one of the embodiments presented hereinbefore, and wherein the servomechanism is selected from among the following elements: servomotor, stepping motor, couple motor, electromagnet, hands moving above a dial, optical displays. According to one particular embodiment, the servomechanism is an electrostatic motor formed by micro-electro-mechanical system technology (MEMS).

It will be understood that various alterations and/or improvements evident to those skilled in the art could be made to the various embodiments of the invention described in the present description, particularly it should be noted that the measuring means could be implemented differently by comprising for example three sized capacitance branches, that the regulating means could be implemented without any difficulty by those skilled in the art for example by means of analogue digital converters and a variable length pulse generator, without departing from the scope of the invention defined by the annexed claims.

What is claimed is:

1. A control system for a servomechanism including:
a control member mobile between first and second positions defining a variable electric quantity, respectively between a minimum quantity and a maximum quantity;
wherein the control system further includes:
low voltage powering means;
voltage increase means connected to the terminals of said low voltage powering means and delivering a high voltage at output;
means for measuring a value of said variable electric quantity, powered by said low voltage powering means when said high voltage is being generated, and
means for regulating said voltage increase means arranged for increasing the high voltage delivered for a variation in said measured values of said variable electric quantity lower than a variation threshold determined by said servomechanism, respectively for decreasing the high voltage delivered for a variation in said measured values of said variable electric quantity higher than said determined variation threshold.

2. The control system according to claim 1, wherein said mobile control member is an electrostatic actuator.

3. The control system according to claim 2, wherein said electrostatic actuator is a comb drive member.

4. The control system according to claim 1, wherein said voltage increase means include an inductance in series with uncoupling means and first switching means having one control terminal and two current terminals, said inductance being connected to the output of said low voltage powering means and the uncoupling means whose output is connected to one current terminal of said switching means, the other current terminal of said switching means being connected to a reference potential, the control terminal of said switching means being connected to the output of said regulating means.

5. The control system according to claim 4, wherein said voltage increase means further include second switching means connected between the output of said inductance and said reference potential.

6. The control system according to claim 4, wherein said variable electric quantity is a variable capacitance defined by the position of said mobile control member and connected between the output of said voltage increase means and said measuring means.

7. The control system according to claim 6, wherein said means for measuring a value of said variable electric quantity include:
- a first parallel connected branch of said first switching means and including in series a first capacitance and a second capacitance of an order of magnitude greater than that of said first capacitance, and
- a second branch connected between said variable capacitance and said reference potential and including a third capacitance of an order of magnitude greater than that of said first capacitance.

8. The control system according to claim 4, wherein said regulating means are arranged for providing a pulse of longer length than that of the preceding pulse across said control terminal of said first switching means to increase said high voltage and to provide a pulse of shorter length than the preceding pulse across said control terminal of said first switching means to decrease said high voltage.

9. The control system according to claim 5, wherein said regulating means are arranged for providing a pulse of longer length than the preceding pulse across said control terminal of said second switching means to increase said high voltage and for providing a pulse of shorter length than the preceding pulse across said control terminal of said second switching means to decrease said high voltage.

10. The control system according to claim 9, wherein said regulating means are also arranged for providing a pulse across the control terminal of said first switching means to decrease the high voltage.

11. The control system according to claim 8, wherein the regulating means are also arranged for providing a very long pulse in the event of detection of a failure during the preceding command.

12. The control system according to claim 9, wherein the regulating means are also arranged for providing a very long pulse in the event of detection of a failure during the preceding command.

13. Servomechanism including a control system according to claim 1, wherein said servomechanism is selected from among the following elements: servomotor, stepping motor, couple motor, electromagnet, hands mobile above a dial, optical displays.

14. Servomechanism according to claim 13, wherein said servomechanism is an electrostatic motor formed by micro-electro-mechanical system technology.

15. Portable electronic apparatus, in particular for a wristwatch including a servomechanism according to claim 13.

* * * * *